United States Patent
Diefenbach

(10) Patent No.: US 6,521,728 B1
(45) Date of Patent: Feb. 18, 2003

(54) PARTICULATE GROUP 4 METALLOCENE-ALUMINOXANE CATALYST COMPOSITIONS DEVOID OF PREFORMED SUPPORT, AND THEIR PREPARATION AND THEIR USE

(75) Inventor: Steven P. Diefenbach, Baton Rouge, LA (US)

(73) Assignee: Albemarle Corporation, Richmond, VA (US)

( * ) Notice: Subject to any disclaimer, the term of this patent is extended or adjusted under 35 U.S.C. 154(b) by 0 days.

(21) Appl. No.: 09/571,480

(22) Filed: May 16, 2000

Related U.S. Application Data

(62) Division of application No. 08/986,824, filed on Dec. 8, 1997, now abandoned.

(51) Int. Cl.$^7$ ................................................. C08F 4/64
(52) U.S. Cl. ...................... 526/165; 526/127; 526/160; 526/352; 526/943; 502/108; 502/103
(58) Field of Search ................................. 526/127, 160, 526/165, 943, 352

(56) References Cited

U.S. PATENT DOCUMENTS

| | | | |
|---|---|---|---|
| 4,542,199 A | * 9/1985 | Kaminsky et al. | 526/160 |
| 4,701,432 A | 10/1987 | Welborn, Jr. | 502/113 |
| 4,752,597 A | 6/1988 | Turner | 502/104 |
| 4,767,735 A | 8/1988 | Ewen et al. | 502/109 |
| 4,791,180 A | 12/1988 | Turner | 526/160 |
| 4,871,705 A | 10/1989 | Hoel | 502/117 |
| 4,892,851 A | 1/1990 | Ewen et al. | 502/104 |
| 4,923,833 A | 5/1990 | Kioka et al. | 502/9 |
| 4,939,217 A | 7/1990 | Stricklen | 526/114 |
| 4,975,403 A | 12/1990 | Ewen | 502/113 |
| 4,978,730 A | 12/1990 | Maezawa et al. | 526/153 |
| 5,001,205 A | 3/1991 | Hoel | 526/128 |
| 5,017,714 A | 5/1991 | Welborn, Jr. | 556/12 |
| 5,071,808 A | 12/1991 | Antberg et al. | 502/107 |
| 5,106,804 A | 4/1992 | Bailly et al. | 502/108 |
| 5,120,867 A | 6/1992 | Welborn, Jr. | 556/12 |
| 5,124,418 A | 6/1992 | Welborn, Jr. | 526/114 |
| 5,126,301 A | 6/1992 | Tsutsui et al. | 502/108 |
| 5,145,819 A | 9/1992 | Winter et al. | 502/117 |
| 5,153,157 A | 10/1992 | Hlatky et al. | 502/117 |
| 5,169,818 A | 12/1992 | Antberg et al. | 502/159 |
| 5,198,401 A | 3/1993 | Turner et al. | 502/155 |
| 5,227,440 A | 7/1993 | Canich et al. | 526/129 |
| 5,229,478 A | 7/1993 | Floyd et al. | 526/160 |
| 5,240,894 A | 8/1993 | Burkhardt et al. | 502/108 |
| 5,276,208 A | 1/1994 | Winter et al. | 556/53 |
| 5,283,300 A | 2/1994 | Haspeslagh et al. | 526/75 |
| 5,308,815 A | 5/1994 | Sangokoya | 502/104 |
| 5,308,816 A | 5/1994 | Tsutsui et al. | 502/108 |
| 5,308,817 A | 5/1994 | Reddy et al. | 502/117 |
| 5,387,567 A | 2/1995 | Tajima et al. | 502/103 |
| 5,466,766 A | 11/1995 | Patsidis et al. | 502/117 |
| 5,492,978 A | 2/1996 | Peifer et al. | 502/117 |
| 5,498,581 A | * 3/1996 | Welch et al. | 502/102 |
| 5,527,930 A | 6/1996 | Sangokoya | 556/179 |
| 5,541,350 A | 7/1996 | Murata et al. | 556/10 |
| 5,585,508 A | 12/1996 | Kuber et al. | 556/11 |
| 5,643,845 A | 7/1997 | Tajima et al. | 502/103 |
| 5,648,310 A | 7/1997 | Wasserman et al. | 502/120 |
| 5,714,425 A | 2/1998 | Chabrand et al. | 502/103 |
| 5,714,555 A | * 2/1998 | Chabrand et al. | 526/127 |

(List continued on next page.)

FOREIGN PATENT DOCUMENTS

| | | |
|---|---|---|
| EP | 0586167 | 3/1994 |
| EP | 0586168 | 3/1994 |
| EP | 586 168 A1 * | 3/1994 |
| EP | 0685495 | 12/1995 |
| EP | 0751155 | 1/1997 |
| WO | 9518836 | 7/1995 |
| WO | 9526369 | 10/1995 |
| WO | 9852686 | 11/1998 |

OTHER PUBLICATIONS

Braca, G. et al., "Organometallic nickel catalysts bound to polymeric matrices in the oligomerization and/or polymerization of olefins with a replica of the support morphology", J. Mol. Catal. (1992), 74(1–3), pp. 421–431.

Braca, G. et al., "Organometallic nickel catalysts anchored on polymeric matrices in the oligomerization and/or polymerization of olefins. Part II. Effect and role of the components of the catalytic system", J. Mol. Catal. A: Chem. (1995), 96(3), pp. 203–213.

Xie, Tuyu, et al., "Gas Phase Ethylene Polymerization: Production Processes, Polymer Properties, and Reactor Modeling", Ind. Eng. Chem. Res. (1994), 33(3), pp. 449–479.

Antberg, M. et al., "Stereospecific polymerizations with metallocene catalysts: products and technological aspects", Makromol. Chem., Macromol. Symp. (1991), 48/49, pp. 333–347.

*Primary Examiner*—Caixia Lu
(74) *Attorney, Agent, or Firm*—Philip M. Pippenger

(57) ABSTRACT

Described are solid olefin polymerization catalysts that have, inter alia, very high productivities (at least 18,000 grams of polyethylene per gram of catalyst in one hour) as shown by a standard test procedure for measuring this property or characteristic. Such particulate catalysts can be prepared by prepolymerizing α-olefin with a Group 4 metallocene-aluminoxane solution, using proportions of α-olefin (most preferably, ethylene) in the range of about 150 to about 1500, and preferably in the range of about 175 to about 1000, moles per mole of Group 4 metallocene used in forming the solution. The atom ratio of aluminum to Group 4 metal in the solution is in the range of about 150:1 to about 1500:1, and preferably in the range of about 175:1 to about 1000:1. In addition, the Group 4 metallocene ingredient used in forming these highly productive catalysts has in its molecular structure at least one polymerizable olefinic substituent. These particulate catalysts do not contain, and thus are not produced in the presence of, a preformed support such as an inorganic compound (silica or etc.) or a preformed particulate polymeric support.

32 Claims, No Drawings

U.S. PATENT DOCUMENTS

| | | | |
|---|---|---|---|
| 5,726,264 A | 3/1998 | Jung et al. | 502/108 |
| 5,733,834 A | 3/1998 | Soga et al. | 502/117 |
| 5,739,368 A | 4/1998 | Krzystowczyk et al. | 502/117 |
| 5,747,405 A | 5/1998 | Little et al. | 502/117 |
| 5,759,940 A | 6/1998 | Sacchetti et al. | 502/134 |
| 5,770,755 A | 6/1998 | Schertl et al. | 502/103 |
| 5,854,363 A | 12/1998 | Jung et al. | 502/103 |
| 5,883,275 A | 3/1999 | Bingel et al. | 502/103 |
| 5,919,877 A | 7/1999 | Tanaglia | 526/153 |

* cited by examiner

PARTICULATE GROUP 4 METALLOCENE-ALUMINOXANE CATALYST COMPOSITIONS DEVOID OF PREFORMED SUPPORT, AND THEIR PREPARATION AND THEIR USE

REFERENCE TO RELATED APPLICATION

This is a Division of my prior application Ser. No. 08/986,824, filed Dec. 8, 1997, now abandoned the entire disclosure of which, including all of the claims thereof, is incorporated herein by reference.

TECHNICAL FIELD

This invention relates to novel, highly effective solid aluminoxane/metallocene olefin polymerization catalysts, their preparation, and their use.

BACKGROUND

Hydrocarbylaluminoxanes (also known as alumoxanes) complexed with transition metal compounds, such as metallocenes, have been found to be effective olefin polymerization catalysts. Methylaluminoxanes are especially effective catalyst components in forming homogeneous catalyst systems with various metallocenes. However, these catalyst systems have proven to be considerably less effective in productivity per unit weight of catalyst when used as supported heterogeneous catalysts, either in the form of dispersions in a liquid medium or as supported solid catalysts in gas-phase polymerizations. For example, in U.S. Pat. No. 5,126,301 issued Jun. 30, 1992 to Tsutsui et al. it is pointed out that when an olefin is polymerized or copolymerized in a dispersion or gas-phase polymerization system by utilizing carrier-supported metallocene-aluminoxane catalysts, polymerization activity is markedly reduced, that the properties inherent to the catalyst comprising the transition metal compound and the aluminoxane catalyst component are not fully exerted, and that powder properties such as bulk density of the thus prepared polymer were insufficient. The approach taken by Tsutsui et al. was to form a solid catalyst by contacting an α-olefin with a mixture obtained by mixing an organoaluminum compound having a branched alkyl radical, an aluminoxane of specified aluminum content, a fine-particle carrier, and a transition metal metallocene compound.

Despite various improvements made during the course of extensive research activities by various laboratories, a need has existed for olefin polymerization catalysts having even better performance characteristics. For example, U.S. Pat. No. 5,498,581 issued Mar. 12, 1996 to Welch et al., points out that evaluation of attempts disclosed in U.S. Pat. Nos. 5,240,894; 4,871,705; and 5,106,804 to overcome the disadvantages of metallocene catalysts has revealed that there is still room for improvement, particularly when the catalyst is one which is to be used in a slurry-type polymerizations. The techniques disclosed in U.S. Pat. Nos. 5,240,894; 4,871,705; and 5,106,804 involve prepolymerization of the metallocene-aluminoxane catalyst system either in the presence or absence of a support.

The improved method of Welch et al. U.S. Pat. No. 5,498,581 for preparing a solid metallocene-containing catalyst system comprises (a) combining in a liquid an organoaluminoxane and at least one metallocene having at least one cyclopentadienyl, indenyl, tetrahydroindenyl, octahydrofluorenyl, or fluorenyl ligand having at least one olefinically unsaturated substituent to form a liquid catalyst system, (b) conducting prepolymerization of at least one olefin in the presence of said catalyst system to produce a prepolymerized solid catalyst containing no more than about 95 weight percent prepolymer, and (c) separating the resulting solid from the liquid and components dissolved in the liquid. The patent reports in Table I that by use of the Welch et al. method, catalysts having productivities as high as 9840 grams of polyethylene per gram of catalyst per hour were formed.

SUMMARY OF THE INVENTION

This invention provides solid olefin polymerization catalysts that are believed to have substantially higher productivities than any previously known heterogeneous olefin catalyst or catalyst system devoid of an inorganic support and any other kind of preformed support.

In addition, this invention makes possible the provision of catalysts that have excellent morphology and handling characteristics, and that are capable of producing olefin homopolymers and copolymers having a combination of very desirable physical attributes and properties. In fact, the morphology of the particulate catalysts formed in the preferred manner of this invention is comparable to (on a par with) the best particulate catalysts previously made in these laboratories or received heretofore from outside sources. It is worth observing that such prior catalysts were formed using a silica support.

In accordance with one embodiment of this invention there is provided a particulate α-olefin prepolymer-Group 4 metallocene-aluminoxane catalyst composition having a productivity of at least 18,000 grams of polyethylene per gram of catalyst in one hour. Preferred catalysts are those in which this productivity characteristic is at least 25,000, and particularly preferred catalysts are those in which this productivity characteristic is at least 30,000.

It has been discovered that particulate olefin polymerization catalysts having such exceptionally high productivities can be prepared by prepolymerizing α-olefin with a Group 4 metallocene-aluminoxane solution, provided the proportion of α-olefin (most preferably, ethylene) is in the range of about 150 to about 1500, and preferably in the range of about 175 to about 1000, moles per mole of Group 4 metallocene used in forming the solution. It is also important in carrying out this process to use a solution in which the atom ratio of aluminum to Group 4 metal in the solution is in the range of about 150:1 to about 1500:1, and preferably in the range of about 175:1 to about 1000:1. In addition, the Group 4 metallocene ingredient used in forming these new, highly productive catalysts has in its molecular structure at least one polymerizable olefinic substituent.

Another feature of these catalysts is that they are self-supporting catalysts. By this is meant that the catalyst particles do not contain, and thus are not produced in the presence of, a preformed support such as an inorganic compound (silica or etc.) or a preformed particulate polymeric support. Instead, the prepolymer is formed in the presence of the combination of at least one Group 4 metallocene and at least one aluminoxane in an initially homogeneous liquid organic solvent phase from which the catalyst particles precipitate, wherein such combination is in whatever chemical composition or makeup it assumes or acquires when the metallocene and the aluminoxane are brought together in the solvent. According to the present state of knowledge in the art, when a metallocene and an aluminoxane are brought together in an inert organic solvent they are understood to undergo chemical reaction with each other to thereby form a reaction product. Accordingly, in accordance with the present state of knowledge in the art, the prepolymer of the catalyst compositions of this invention is believed to be formed in the presence of the reaction product of at least one Group 4 metallocene and at least one aluminoxane in an initially homogeneous organic liquid solvent phase from which the catalyst particles precipitate.

In preferred embodiments, the above catalysts of this invention have a specific surface area of no more than about 20 square meters per gram ($m^2/g$), and preferably less than 10 $m^2/g$.

A preferred method for producing the highly productive catalysts of this invention is a process which comprises:

a) mixing together in an organic solvent medium at least one metallocene, preferably a metallocene of a Group 4 metal, and at least one aluminoxane, preferably a methylaluminoxane to form a catalytic solution; and b) contacting catalytic solution from a) with a controlled amount of α-olefin monomer, preferably ethylene, under polymerization conditions such that particulate solids are formed having a specific surface area of no more than about 20 square meters per gram ($m^2/g$).

When performed properly, the recovered and dried catalyst has a productivity of at least 18,000 grams of polyethylene per gram of catalyst in one hour.

It is interesting to compare the unsupported catalysts of this invention and the productivity thereof with the catalysts and productivity ("polymerization activity") of the catalysts reported in U.S. Pat. No. 4,923,833 issued to Kioka et al. on May 8, 1990. Unlike the present invention, Kioka et al. produce solid unsupported catalysts by (a) contacting a solution of an aluminoxane in a first solvent with a second solvent in which the aluminoxane is insoluble or sparingly soluble, to precipitate solid aluminoxane to form a suspension, and (b) contacting the resulting suspension of solid aluminoxane with a solution of a compound of a Group 4 metal, such as a metallocene thereof, in a third solvent, to form solid fine particles. Thereafter ethylene is fed to the solution to effect prepolymerization. Thus the Kioka et al. solid particles are formed first by precipitating the aluminoxane as solid particles and then causing the interaction between the metallocene and the aluminoxane. In contrast, the present invention involves interacting the metallocene and the aluminoxane in solution, and introducing a controlled amount of ethylene or other vinyl monomer to cause formation of solid particles in the liquid medium. The highest productivity shown in the Kioka et al. patent for their catalysts is in Example 6 wherein the productivity ("polymerization activity") was 27,100 g PE/mM Zr in a slurry polymerization process in which an ethylene-4-methyl-1-pentene copolymer was produced. When expressing productivity on the same basis as used by Kioka et al., the catalysts of the present invention have a "polymerization activity" of at least about 600,000 g PE/mM Zr.

Other embodiments and features of the invention will become still further apparent from the ensuing description and appended claims.

FURTHER DETAILED DESCRIPTION

Aluminoxanes

Hydrocarbylaluminoxanes are formed by the partial hydrolysis of hydrocarbyl-aluminum compounds and, especially, trialkylaluminums such as trimethylaluminum.

Hydrocarbylaluminoxanes may exist in the form of linear, cyclic, caged or polymeric structures with the simplest monomeric compounds being a tetraalkylaluminoxane such as tetramethylaluminoxane of the formula $(CH_3)_2AlOAl(CH_3)_2$, or tetraethylaluminoxane of the formula $(C_2H_5)_2AlOAl(C_2H_5)_2$. The compounds preferred for use in olefin polymerization catalysts are oligomeric materials, sometimes referred to as polyalkylaluminoxanes, which usually contain about 4 to 20 of the repeating units:

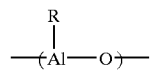

where R is $C_1$–$C_{10}$ alkyl. Especially preferred are polymethylaluminoxanes (MAOs). Although the linear and cyclic aluminoxanes are often noted as having the structures

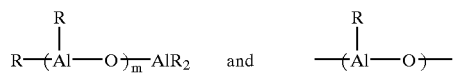

where m and n are integers of 4 or more, the exact configuration of the aluminoxanes remains unknown.

Methylaluminoxanes can contain some higher alkyl groups to improve their solubility. Such modified methylaluminoxanes are described, for example, in U.S. Pat. No. 5,157,008. Besides MAO, non-limiting examples of hydrocarbylaluminoxanes for use in the invention include ethylaluminoxane (EAO), isobutylaluminoxane (IBAO), n-propylaluminoxane, n-octylaluminoxane, and the like. The hydrocarbylaluminoxanes can also contain up to about 20 mole percent (based on aluminum) of moieties derived from amines, alcohols, ethers, esters, phosphoric and carboxylic acids, thiols, alkyl disiloxanes and the like to improve their activity, solubility and/or stability.

The aluminoxanes can be prepared as known in the art by the partial hydrolysis of trialkylaluminum compounds. The trialkylaluminum compounds can be hydrolyzed by reacting them with either free water or water containing solids, which can be either hydrates or porous materials which have absorbed water. Because it is difficult to control the reaction by adding water per se, even with vigorous agitation of the mixture, the free water is usually added in the form of a solution or a dispersion in an organic solvent. Suitable hydrates include salt hydrates such as, for example, $CuSO_4.5H_2O$, $Al_2(SO_4)_3.18H_2O$, $FeSO_4.7H_2O$, $AlCl_3.6H_2O$, $Al(NO_3)_3.9H_2O$, $MgSO_4.7H_2O$, $MgCl_2.6H_2O$, $ZnSO_4.7H_2O$, $NaSO_4,10H_2O$, $Na_3PO_4.12H_2O$, $LiBr.2H_2O$, $LiCl1H_2O$, $LiI.2H_2O$, $LiI.3H_2O$, $KF.2H_2O$ $NaBr.2H_2O$ and the like and alkali metal or alkaline earth metal hydroxide hydrates such as, for example, $NaOH.H_2O$, $NaOH.2H_2O$, $Ba(OH)_2.8H_2O$, $KOH.2H_2O$, $CsOH.1H_2O$, $LiOH.1H_2O$ and the like. Mixtures of any of the above hydrates can be used. The mole ratios of free water or water in the hydrate or in porous materials such as alumina or silica to total alkyl aluminum compounds in the mixture can vary widely, such as for example from about 2:1 to 1:4, with ratios of from about 4:3 to 1:3.5 being preferred.

Such hydrocarbylaluminoxanes and processes for preparing hydrocarbylaluminoxanes are described, for example, in U.S. Pat. Nos. 4,908,463; 4,924,018; 5,003,095; 5,041,583; 5,066,631; 5,099,050; 5,157,008; 5,157,137; 5,235,081; 5,248,801, and 5,371,260, whose entire teachings are incorporated herein by reference. The methylaluminoxanes contain varying amounts, of from about 5 to 35 mole percent, of the aluminum value as unreacted trimethylaluminum. Preferably, the aluminum content as trimethylaluminum is less than about 23 mole percent of the total aluminum value, and, more preferably, less than about 20 mole percent.

The aluminoxanes can be used as supplied or they can be subjected to a heat treatment prior to being used in forming the catalyst compositions of this invention. While it may be possible to heat treat the aluminoxane while in neat form, it is preferable to heat a solution or slurry of one or more aluminoxanes, preferably methylaluminoxane, in a suitable inert anhydrous solvent such as a hydrocarbon solvent. Paraffinic and cycloparaffinic hydrocarbon solvents which can be used to form solutions or slurries of the aluminoxanes include pentane, isopentane, hexane, cyclohexane, heptane, octane, decane, dodecane, hexadecane, and the like, with those having carbon numbers of 5 to 10 being preferred. Liquid mononuclear aromatic hydrocarbons which can be used include such solvents as benzene, toluene, one or more xylenes, cumene, ethylbenzene, mesitylene, and aromatic hydrocarbon mixtures or blends such as aromatic naphthas, BTX, aromatic gasoline fractions, with those having carbon numbers of 6 to 20 being preferred. As a class, the aromatic solvents are preferred.

When utilizing previously heat-treated aluminoxanes in forming the particulate catalysts of this invention, it is desirable to use one or more aluminoxanes that have been heat treated while in a hydrocarbon solution which, before heat treatment, contains at least about 5 wt % and up to about 50 wt % or more, preferably in the range of about 10 to about 40 wt %, and more preferably in the range of about 25 to about 30 wt % of one or more hydrocarbylaluminoxanes, especially methylaluminoxane, in whatever form or composition such compounds exist while in such solution. The solvent is usually a paraffinic, cycloparaffinic and/or aromatic solvent, and most preferably is a liquid mononuclear aromatic hydrocarbon solvent (e.g., toluene or xylene). Heating the solution at a temperature of at least about 40° C. for a suitable period of time can increase the productivity of catalyst compositions of this invention made using such heat-treated aluminoxane(s). It has been observed that by heating a visually clear solution of a freshly-produced methylaluminoxane in an aromatic solvent such as toluene at a temperature of at least about 40° C., and preferably at least about 70° C., for a suitable period of time the resultant solution, when chilled to a suitably low temperature such as −15° C. for about 8 hours, will contain a visually perceptible amount of gel whereas the same methylaluminoxane solution which has not been heat treated does not exhibit visually perceptible gel formation when chilled in the same manner. Similarly, such heat treatment, if applied to an aged methylaluminoxane-toluene solution which already contains a visually perceptible amount of gel, tends to result in an increased amount of visually perceptible gel content after maintaining the heat treated solution at −15° C. for 8 hours. At present it is not known exactly what is taking place during the heating of the aluminoxane solution, or why the resultant heat-treated aluminoxane solution can increase the activity of catalyst compositions made therefrom.

Aluminoxane heat treatment temperatures in the range of about 40 up to about 130° C. are typical, and the preferred temperatures, especially, when heat-treating methylaluminoxanes, are in the range of about 70 to about 90° C. The duration of the time periods during which the aluminoxane is heated will vary depending chiefly upon the temperature(s) being used and the concentration of the initial aluminoxane solution; in general the higher the temperature and/or concentration, the shorter the time. Typically the time periods will fall in the range of about 0.5 to about 72 hours and with preferred temperatures and aluminoxane concentrations, time periods in the range of about 1 to about 12 hours will normally suffice. For example, with 30 wt % methylaluminoxane solutions in toluene or equivalent aromatic solvent, heating at 80° C. for from about 2 to about 12 hours is a preferred way to operate. It will be understood that on the basis of this disclosure, departures from the foregoing ranges of temperatures, times and/or initial aluminoxane concentrations may be made whenever deemed necessary or desirable.

Metallocenes

As used in the specification and claims, the term "metallocene" includes metal derivatives which contain at least one cyclopentadienyl moiety. The metallocenes used in forming the self-supported, solid catalysts of this invention are those having at least one polymerizable olefinic substituent such as hydrocarbyl group having a terminal carbon-to-carbon double bond in the molecule. Such substituent(s) can be present (a) on a cyclopentadienyl, indenyl, fluorenyl, tetrahydroindenyl, benzoindenyl or like cyclopentadienyl-moiety-containing group of the metallocene, (b) on a bridging group linking a pair of cyclopentadienyl-moiety-containing groups together in the metallocene, (c) on the Group 4 metal atom of the metallocene, or (d) on any two or more of (a), (b), and (c). Examples of such terminal olefinically substituted metallocenes are metallocenes of the type disclosed or taught, for example, in U.S. Pat. No. 5,145,819 to Winter et.al., U.S. Pat. No. 5,169,818 to Antberg et al., U.S. Pat. No. 5,498,581 to Welch et al., and U.S. Pat. No. 5,541,350 to Murata et al., the complete disclosures of which are incorporated herein by reference. A few such olefinically substituted metallocenes include the following:

(cyclopentadienyl)(vinylcyclopentadienyl)zirconium dichloride,
bis(vinylcyclopentadienyl)zirconium dichloride,
bis(2,3-dimethyl-5-vinylcyclopentadienyl)zirconium dichloride,
(cyclopentadienyl)(vinylcyclopentadienyl)zirconium dimethyl,
bis(vinylcyclopentadienyl)zirconium dimethyl,
bis(2,3-dimethyl-5-vinylcyclopentadienyl)zirconium dimethyl,
(cyclopentadienyl)(vinylcyclopentadienyl)hafnium dichloride,
bis(vinylcyclopentadienyl)hafnium dichloride,
bis(2,3-dimethyl-5-vinylcyclopentadienyl)hafnium dichloride,
(cyclopentadienyl)(vinylcyclopentadienyl)hafnium dimethyl,
bis(vinylcyclopentadienyl)hafnium dimethyl,
bis(2,3-dimethyl-5-vinylcyclopentadienyl)hafnium dimethyl,
(divinylsilyl)bis(indenyl)zirconium dichloride (also known as divinylsilanediylbis(indenyl) zirconium dichloride),
(divinylsilyl)bis(2-methylindenyl)zirconium dichloride,
(divinylsilyl)bis(2-ethylindenyl)zirconium dichloride,
(diallylsilyl)bis(indenyl)zirconium dichloride,
(diallylsilyl)bis(2-methylindenyl)zirconium dichloride,
(diallylsilyl)bis(2-ethylindenyl)zirconium dichloride,
(diallylsilyl)bis(indenyl)zirconium dichloride,
(methylvinylsilyl)bis(indenyl)zirconium dichloride,
(methylallylsilyl)bis(indenyl)zirconium dichloride,
(divinylsilyl)bis(2-methylindenyl)zirconium dimethyl,
(divinylsilyl)bis(2-ethylindenyl)zirconium dimethyl,
(diallylsilyl)bis(2-methylindenyl)zirconium dimethyl,
(diallylsilyl)bis(2-ethylindenyl)zirconium dimethyl,
(divinylsilyl)bis(2-methylindenyl)zirconium(methyl) (phenyl),
(methylvinylsilyl)bis( indenyl)zirconium dimethyl,
(methylallylsilyl)bis(indenyl)zirconium dimethyl,
(cyclopentadienyl)(vinylcyclopentadienyl)hafnium dichloride, bis(vinylcyclopentadienyl)hafnium dichloride,
bis(2,3-dimethyl-5-vinylcyclopentadienyl)hafnium dichloride,
(cyclopentadienyl)(vinylcyclopentadienyl)hafnium dimethyl,
bis(vinylcyclopentadienyl)hafnium dimethyl,
bis(2,3-dimethyl-5-vinylcyclopentadienyl)hafnium dimethyl,
(cyclopentadienyl)(vinylcyclopentadienyl)hafnium dichloride,
bis(vinylcyclopentadienyl)hafnium dichloride,
bis(2,3-dimethyl-5-vinylcyclopentadienyl)hafnium dichloride,
(cyclopentadienyl)(vinylcyclopentadienyl)hafnium dimethyl,
bis(vinylcyclopentadienyl)hafnium dimethyl,
bis(2,3-dimethyl-5-vinylcyclopentadienyl)hafnium dimethyl,
(divinylsilyl)bis(indenyl)hafnium dichloride (also known as divinylsilanediylbis(indenyl)hafnium dichloride),
(divinylsilyl)bis(2-methylindenyl)hafnium dichloride,
(divinylsilyl)bis(2-ethylindenyl)hafnium dichloride,
(diallylsilyl)bis(indenyl)hafnium dichoride,
(diallylsilyl)bis(2-methylindenyl)hafnium dichloride,
(diallylsilyl)bis(2-ethylindenyl)hafnium dichloride,
(diallylsilyl)bis(indenyl)hafnium dichloride,
(methylvinylsilyl)bis(indenyl)hafnium dichloride,
(methylallylsilyl)bis(indenyl)hafnium dichloride,
(divinylsilyl)bis(2-methylindenyl)hafnium dimethyl,
(divinylsilyl)bis(2-ethylindenyl)hafnium dimethyl,
(diallylsilyl)bis(2-methylindenyl)hafnium dimethyl,
(diallylsilyl)bis(2-ethylindenyl)hafnium dimethyl,
(divinylsilyl)bis(2-methylindenyl)hafnium(methyl)(phenyl),
(methylvinylsilyl)bis(indenyl)hafnium dimethyl,
(methylallylsilyl)bis(indenyl)hafnium dimethyl,
(diallylamino)(methyl)silylbis(cyclopentadienyl)titanium dichloride,
(diallylamino)(phenyl)silylbis(cyclopentadienyl)titanium dichloride,
(diallylamino)(methyl)silylbis(cyclopentadienyl)titanium dimethyl,
(diallylamino)(phenyl)silylbis(cyclopentadienyl)titanium dimethyl,
bis[(diallylamino)]silylbis(cyclopentadienyl)titanium dichloride,
bis[(diallylamino)]silylbis(cyclopentadienyl)titanium dimethyl,
bis[(diallylamino)]silylbis(methylcyclopentadienyl)titanium dichloride,
bis[(diallylamino)]silylbis(methylcyclopentadienyl)titanium dimethyl,
bis[(diallylamino)]silylbis(indenyl)titanium dichloride,
bis[(diallylamino)]silylbis(indenyl)titanium dimethyl,
bis[(diallylamino)]silylbis(2-methylindenyl)titanium dichloride,
bis[(diallylamino)]silylbis(2-methylindenyl)titanium dimethyl,
bis[(diallylamino)]silylbis(pentamethylcyclopentadienyl)titanium dichloride,
bis[(diallylamino)]silylbis(pentamethylcyclopentadienyl)titanium dimethyl,
(diallylamino)(methyl)silylbis(cyclopentadienyl)zirconium dichloride,
(diallylamino)(phenyl)silybis(cyclopentadiennyl)zirconium dichloride,
(diallylamino)(methyl)silylbis(cyclopentadienyl)zirconium dimethyl,
(diallylamino)(phenyl)silylbis(cyclopentadienyl)zirconium dimethyl,
bis[(diallylamino)]silylbis(cyclopentadienyl)zirconium dichloride,
bis[(diallylamino)]silylbis(cyclopentadienyl)zirconium dimethyl,
bis[(diallylamino)]silylbis(methylcyclopentadienyl)zirconium dichloride,
bis[(diallylamino)]silylbis(methylcyclopentadienyl)zirconium dimethyl,
bis[(diallylamino)]silylbis(indenyl)zirconium dichloride,
bis[(diallylamino)]silylbis(indenyl)zirconium dimethyl,
bis[(diallylamino)]silylbis(2-methylindenyl)zirconium dichloride,
bis[(diallylamino)]silylbis(2-methylindenyl)zirconium dimethyl,
bis[(diallylamino)]silylbis(pentamethylcyclopentadienyl)zirconium dichloride,
bis[(diallylamino)]silylbis(pentamethylcyclopentadienyl)zirconium dimethyl,
(diallylamino)(methyl)silylbis(cyclopentadienyl)hafnium dichloride,
(diallylamino)(phenyl)silylbis(cyclopentadienyl)hafnium dichloride,
(diallylamino)(methyl)silylbis(cyclopentadienyl)hafnium dimethyl,
(diallylamino)(phenyl)silylbis(cyclopentadienyl)hafnium dimethyl,
bis[(diallylamino)]silylbis(cyclopentadienyl)hafnium dichloride,
bis[(diallylamino)]silylbis(cyclopentadienyl)hafnium dimethyl,
bis[(diallylamino)]silylbis(methylcyclopentadienyl)hafnium dichloride,
bis[(diallylamino)]silylbis(methylcyclopentadienyl)hafnium dimethyl,
bis[(diallylamino)]silylbis(indenyl)hafnium dichloride,
bis[(diallylamino)]silylbis(indenyl)hafnium dimethyl,
bis[(diallylamino)]silylbis(2-methylindenyl)hafnium dichloride,
bis[(diallylamino)]silylbis(2-methylindenyl)hafnium dimethyl,
bis[(diallylamino)]silylbis(pentamethylcyclopentadienyl)hafnium dichloride,
bis[(diallylamino)]silylbis(pentamethylcyclopentadienyl)hafnium dimethyl,
bis(cyclopentadienyl)zirconium diallyl,
bis(methylcyclopentadienyl)zirconium diallyl,
bis(2,3,5-trimethylcyclopentadienyl)zirconium diallyl,
(cyclopentadienyl)(pentamethylcyclopentadienyl)zirconium diallyl,
bis(methylindenyl)zirconium diallyl,
(indenyl)(2-methylindenyl)zirconium diallyl,
bis(cyclopentadienyl)hafnium diallyl,
bis(methylcyclopentadienyl)hafnium diallyl,
bis(2,3,5-trimethylcyclopentadienyl)hafnium diallyl,
(cyclopentadienyl)(pentamethylcyclopentadienyl)hafnium diallyl,
bis(methylindenyl)hafnium diallyl,
(indenyl)(2-methylindenyl)hafnium diallyl.

Preferred metallocenes include such compounds as the following:
5-(cyclopentadienyl)-5-(9-fluorenyl)1-hexene zirconiun dichloride,
bis(9-fluorenyl)(methyl)(vinyl)silane zirconium dichloride,
bis(9-fluorenyl)(methyl)(prop-2-enyl)silane zirconium dichloride, bis(9-fluorenyl)(methyl)(but-3-enyl)silane zirconium dichloride,
bis(9-fluorenyl)(methyl)(hex-5-enyl)silane zirconium dichloride,
bis(9-fluorenyl)(methyl)(oct-7-enyl)silane zirconium dichloride,
(cyclopentadienyl)(1-allylindenyl) zirconium dichloride,
bis(1-allylindenyl)zirconium dichloride,
(9-(prop-2-enyl)fluorenyl)(cyclopentadienyl)zirconium dichloride,
(9-(prop-2-enyl)fluorenyl)(pentamethylcyclopentadienyl) zirconium dichloride,
bis(9-(prop-2-enyl)fluorenyl) zirconium dichloride,
(9-(cyclopent-2-enyl)fluorenyl)(cyclopentadienyl) zirconium dichloride,
bis(9-(cyclopent-2-enyl)fluorenyl)zirconium dichloride,
5-(2-methylcyclopentadienyl)-5(9-fluorenyl)-1-hexene zirconium dichloride,
1-(9-fluorenyl)-1-(cyclopentadienyl)-1-(but-3-enyl)-1-(methyl)methane zirconium dichloride,
5-(fluorenyl)-5-(cyclopentadienyl)-1-hexene hafnium dichloride,
(9-fluorenyl)(1-allylindenyl)dimethylsilane zirconium dichloride,
1-(2,7-di(alpha-methylvinyl)(9-fluorenyl))-1-(cyclopentadienyl)-1,1-dimethylmethane zirconium dichloride,
1-(2,7-di(cyclohex-1-enyl)(9-fluorenyl))-1-(cyclopentadienyl)-1,1-methane zirconium dichloride,
5-(cyclopentadienyl)-5-(9-fluorenyl)-1-hexene titanium dichloride,
bis(9-fluorenyl)(methyl)(vinyl)silane titanium dichloride,
bis(9-fluorenyl)(methyl)(prop-2-enyl)silane titanium dichloride,
bis(9-fluorenyl)(methyl)(but-3-enyl)silane titanium dichloride,
bis(9-fluorenyl)(methyl)(hex-5-enyl)silane titanium dichloride,
bis(9-fluorenyl)(methyl)(oct-7-enyl)silane titanium dichloride,
(cyclopentadienyl)(1-allylindenyl) titanium dichloride,
bis(1-allylindenyl)titanium dichloride,
(9-(prop-2-enyl)fluorenyl)(cyclopentadienyl)hafnium dichloride,
(9-(prop-2-enyl)fluorenyl)(pentamethylcyclopentadienyl) hafnium dichloride,
bis(9-(prop-2-enyl)fluorenyl) hafnium dichloride,
(9-(cyclopent-2-enyl)fluorenyl)(cyclopentadienyl) hafnium dichloride,
bis(9-(cyclopent-2-enyl)fluorenyl)hafnium dichloride,
5-(2-methylcyclopentadienyl)-5(9-fluorenyl)-1-hexene hafnium dichloride,
5-(fluorenyl)-5-(cyclopentadienyl)-1-octene hafnium dichloride,
(9-fluorenyl)(1-allylindenyl)dimethylsilane hafnium dichloride.

It will be noted that the metallocene ingredients are metallocenes of a Group 4 metal, namely, titanium, zirconium or hafnium preferably having two cyclopentadienyl moiety-containing groups which can be separate moieties or they can be joined together by means of a bridge such as, for example, a divalent hydrocarbyl bridge, a silicon-containing divalent bridge, or a germanium-containing divalent bridge, and in any case the metallocene contains polymerizable olefinic substitution in the molecule.

Suitable transition metal compounds which may be used together with the metallocene include the well known Ziegler-Natta catalyst compounds of Group 4–6 metals. Non-limiting illustrative examples of such transition metals include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_3H_7)_2Br_2$, $VCl_4$, $VOCl_3$, $VO(OC_2H_5)_3$, $ZrCl_4$, $ZrCl_3(OC_2H_5)$, $Zr(OC_2H_5)_4$, $ZrCl(OC_4H_9)_3$, and the like.

Olefins

In general, any polymerizable olefinic hydrocarbon or combination of polymerizable olefinic hydrocarbons can be used in forming the catalyst compositions of this invention. Typically, they are one or more alpha-olefins having up to about 18 carbon atoms, although alpha-olefin monomers having even higher carbon atom contents may be used. A few examples include styrene, 1-pentene, 4-methyl-1-butene, 1-hexene, 4-methyl-1-pentene, 1-octene, 1-decene, 1-octadecene, and vinylcyclohexane. Preferred are α-olefins having up to about 8 carbon atoms, and more preferred are the α-olefinic hydrocarbons having from 2 to 4 carbon atoms, namely ethylene, propylene and 1-butene or combinations of any two or all three of these. Combinations of ethylene or propylene with another α-olefinic hydrocarbon such as 1-pentene, 1-hexene or 1-octene are also suitable. Ethylene itself is the most preferred olefin for use in forming the self-supported catalysts of this invention.

Prepolymerization Conditions

In the practice of this invention the particulate catalyst compositions of this invention are not made in the presence of a preformed organic or inorganic solid support. Thus the prepolymerization solution is free of any such support, and the particulate α-olefin prepolymer-Group 4 metallocene-aluminoxane catalyst compositions of this invention are devoid or free of preformed particulate solids except possibly for trace amounts (e.g., <0.5 wt %) of solid impurities that may be present as adventitious impurities in the materials or reaction equipment used in preparing the catalyst particles.

The hydrocarbon solution in which the prepolymerization is to be performed should contain the aluminoxane and metallocene ingredients (or the reaction product(s) formed in situ therefrom) in proportions such that the atom ratio of aluminum to Group 4 metal in the solution is in the range of about 150:1 to about 1500:1, and preferably in the range of about 175:1 to about 1000:1.

As noted above, the proportion of α-olefin (most preferably, ethylene) to metallocene in the prepolymerization step is in the range of about 150 to about 1500, and preferably in the range of about 175 to about 1000, moles per mole of Group 4 metallocene used in forming the solution in which the prepolymerization is to be conducted. Surprisingly, if the mole ratio of α-olefin Group 4 metallocene used in this process step is significantly above the maximum mole ratio utilized pursuant to this invention, the morphology of the catalyst particles becomes very poor. Thus pursuant to this invention, less rather than more α-olefin used in forming the prepolymerized catalyst particles.

The prepolymerization can be conducted under relatively mild conditions. Typically, this would involve using low pressures of the olefin and relatively low temperatures designed to prevent site decomposition resulting from high concentrations of localized heat. The prepolymerization typically occurs at temperatures in the range of about −15° C. to about +110° C., more preferably in the range of about +10° to about +30° C. The amount of prepolymer can be varied but typically would be in the range of from about 1 to about 95 wt % of the resulting prepolymerized solid catalyst system more preferably about 5 to 80 wt %. It is generally desirable to carry out the prepolymerization to at least a point where substantially all of the metallocene is in the solid rather than in the liquid since that maximizes the use of the metallocene.

After the prepolymerization, the resulting solid prepolymerized catalyst is separated from the liquid of the reaction mixture. Various techniques known in the art can be used for carrying out this step. For example, the material could be separated by filtration, decantation, or by vacuum evaporation. It is currently preferred, however, not to rely upon vacuum evaporation since it is considered desirable to remove substantially all of the soluble components in the liquid reaction product of the prepolymerization from the resulting solid prepolymerized catalyst before it is stored or used for subsequent polymerization. After separating the solid from the liquid the resulting solid is preferably washed with a hydrocarbon and then dried using high vacuum to remove substantially all the liquids and other volatile components that might still be associated with the solid.

Polymerization Processes Using Catalysts of this Invention

The heterogeneous catalysts of this invention can be used in polymerizations conducted as slurry processes or as gas phase processes. By "slurry" is meant that the particulate catalyst is used as a slurry or dispersion in a suitable liquid reaction medium which maybe composed of one or more ancillary solvents (e.g., liquid aromatic hydrocarbons, etc.) or an excess amount of liquid monomer to be polymerized in bulk. Generally speaking, the polymerizations are conducted at one or more temperatures in the range of about 0 to about 160° C., and under atmospheric, subatmospheric, or superatmospheric conditions. Conventional polymerization adjuvants, such as hydrogen, may be employed if desired. Preferably polymerizations conducted in a liquid reaction medium containing a slurry or dispersion of a catalyst of this invention are conducted at temperatures in the range of about 40 to about 110° C. Typical liquid diluents for such processes include hexane, toluene, and like materials. Typically, when conducting gas phase polymerizations, superatmospheric pressures are used, and the reactions are conducted at temperatures in the range of about 50 to about 120° C. These gas phase polymerizations can be performed in a stirred or fluidized bed of catalyst in a pressure vessel adapted to permit the separation of product particles from unreacted gases. Thermostated ethylene, comonomer, hydrogen and an inert diluent gas such as nitrogen can be introduced or recirculated to maintain the particles at the desired polymerization reaction temperature. An aluminum alkyl such as triethylaluminum may be added as a scavenger of water, oxygen and other impurities. In such cases the aluminum alkyl is preferably employed as a solution in a suitable dry liquid hydrocarbon solvent such as toluene or xylene. Concentrations of such solutions in the range of about $5 \times 10^{-3}$ molar are conveniently used. But solutions of greater or lesser concentrations can be used, if desired. Polymer product can be withdrawn continuously or semi-continuously at a rate that maintains a constant product inventory in the reactor.

Polymers can be produced pursuant to this invention by homopolymerization of polymerizable olefins, typically 1-olefins (also known as α-olefins) such as ethylene, propylene, 1-butene, styrene, or copolymerization of two or more copolymerizable monomers, at least one of which is typically a 1-olefin. The other monomer(s) used in forming such copolymers can be one or more different 1-olefins and/or a diolefin, and/or a polymerizable acetylenic monomer. Normally, the hydrocarbon monomers used, such as 1-olefins, diolefins and/or acetylene monomers, will contain up to about 10 carbon atoms per molecule. Preferred 1-olefin monomers for use in the process include ethylene, propylene, 1-butene, 3-methyl-1-butene, 4-methyl-1-pentene, 1-hexene, and 1-octene. It is particularly preferred to use the particulate catalysts of this invention in the polymerization of ethylene, or propylene, or ethylene and at least one $C_3$–$C_8$ 1-olefin copolymerizable with ethylene. Typical diolefin monomers which can be used to form terpolymers with ethylene and propylene include hexadiene, norbornadiene, and similar copolymerizable hydrocarbons. 1-Heptyne and 1-octyne are illustrative of suitable acetylenic monomers which can be used.

Because of the higher activity and productivity of the catalysts of this invention, the amount of the present heterogeneous catalysts used in olefin polymerizations can be somewhat less than is typically used in olefin polymerizations conducted on an equivalent scale. For example, in conducting homopolymerization of ethylene in a 2-liter autoclave with a constant ethylene pressure of 450 psig, excellent results have been achieved using as little as 5 milligrams of catalyst per batch polymerization reaction. Thus in general the polymerizations and copolymerizations conducted pursuant to this invention are carried out using a catalytically effective amount of the heterogeneous catalyst, which amount may be varied depending upon such factors such as the type of polymerization being conducted, the polymerization conditions being used, and the type of reaction equipment in which the polymerization is being conducted. In many cases, the amount of the catalyst of this invention used will be such as to provide in the range of about 0.000001 to about 0.01 percent by weight of Group 4 metal based on the weight of the monomer(s) being polymerized.

After polymerization and deactivation of the catalyst in a conventional manner, the product polymer can be recovered from the polymerization reactor by any suitable means. When conducting the process with a slurry or dispersion of the catalyst in a liquid medium the product typically is recovered by a physical separation technique (e.g. decantation, etc.). The recovered polymer is usually washed with one or more suitably volatile solvents to remove residual polymerization solvent or other impurities, and then dried, typically under reduced pressure with or without addition of heat. When conducting the process as a gas phase polymerization, the product after removal from the gas phase reactor is typically freed of residual monomer by means of a nitrogen purge, and often can be used without further catalyst deactivation or catalyst removal.

When preparing polymers pursuant to this invention conditions may be used for preparing unimodal or multimodal polymer types. For example, mixtures of catalysts of this invention formed from two or more different metallocenes having different propagation and termination rate constants for ethylene polymerizations can be used in preparing polymers having broad molecular weight distributions of the multimodal type.

Productivity Determination

To determine productivity of catalyst particles the following polymerization procedure should be used: A two-liter autoclave is used to carry the polymerizations. The reactor is rinsed with 1100 grams of toluene at a temperature of at least 140° C. for at least 10 minutes. The reactor is then purged with low pressure nitrogen for 5 minutes and then evacuated under vacuum for at least one hour at >140 ° C. The reactor is purged and vented twice with 600 psig nitrogen and twice with one liter (about 80 psig) of isobutane. The isobutane is vented off, but a small isobutane purge on the reactor is maintained. Once the reactor has cooled to below 40° C., about 15 mg of the particulate metallocene/aluminoxane catalyst as a slurry in 2.0 mL of hexane/TEA solution is charged to the reactor against the counterflow of isobutane. The reactor is then filled with 1.0 liter of isobutane. The agitator is set to 1100 rpm and the reactor is heated to 91.5° C. With the reactor temperature at 91.5° C., ethylene is charged in, to give a reactor pressure of 450 psig. Ethylene is polymerized for 1.0 hour. After 1.0 hour, the reactor is slowly vented and cooled. Polyethylene (PE) is removed and weighed. Productivity is calculated by using the expression:

grams PE/grams catalyst×hour.

Productivity is thus determined in the above procedure using the catalyst composition in the form of solid particles; the catalyst is not in solution.

It will be understood and appreciated that the productivity as determined by the above procedure is a property or characteristic of the particulate catalyst to be determined when the catalyst is fresh, the term "fresh" being used in the sense that the catalyst has not been previously used in a polymerization reaction. It is, of course, not necessary to test every batch of fresh catalyst for its productivity, provided the materials and conditions used for preparing the catalyst remain the same from batch to batch, and as long as there is no reason to question the productivity of any particular batch of fresh catalyst where the productivity of one or more prior batches had previously been found to be in accordance with this invention. Thus productivity is a property or inherent characteristic of the particulate catalysts of this invention which manifests itself when and if one or more samples of fresh particulate catalyst are tested for productivity.

It will also be understood and appreciated that the specific surface area is another characteristic of the fresh catalyst.
Determination of Specific Surface Area To determine specific surface area of the particulate catalysts of this invention the well-known BET technique is used. The BET technique (named after the inventors, Braunauer, Emmett, and Teller) consists of (1) removing adsorbed gases from the sample with heat and vacuum, (2) adsorbing a mono-layer of nitrogen on the surface at liquid nitrogen temperature, (3) measuring the amount of adsorbed nitrogen, and (4) calculating the total surface area of the sample from an assumed cross-sectional area of nitrogen molecules. The total surface area is divided by the sample weight to yield the specific surface area. Specific surface area is defined as the exposed surface area of 1 gram of the sample tested. For best results, the Coulter Model 3100 instrument (which automatically applies the BET technique), or equivalent instrument, if any, should be used.

The invention is further illustrated by, but is not intended to be limited to, the following examples. To enable comparison of results, the metallocene used in these examples was the same metallocene as used in the examples of U.S. Pat. No. 5,498,581, viz., 1-(9-fluorenyl)-1-(cyclopentadienyl)-1-(but-3-enyl)-1-(methyl)methane zirconium dichloride.

EXAMPLE 1

A metallocene/methylaluminoxane solution was prepared by adding the olefinic substituted zirconocene (0.00166 mole Zr) to 71.2 grams of 30 wt % methylaluminoxane (MAO) in toluene solution (13.2% Al). The mixture was diluted with 129.2 grams of toluene and then stirred at 25° C. for about 0.5 hour. The metallocene/MAO solution was charged to the reactor. The volume of the contents of the reactor was adjusted to 0.42 liter with addition of toluene. The mixture was cooled to 15° C. The reactor was pressure/vented with ethylene to about 20 psig three to four times to remove nitrogen. The ethylene pressure was adjusted to 5 psig. The prepolymerization of the metallocene/MAO was started. A total of about 33 to 34 grams of ethylene was charged into the reactor over 155 minutes at 15° C./5 psig. The reactor was pressure/vented with nitrogen several times to remove ethylene. The mixture was warmed to 20° C. The contents of the flask were transferred to a nitrogen filled bottle. The bottle was then placed into a dry box. The mixture was filtered through a 600 mL coarse sintered glass frit. The catalyst was washed once with about 300 mL of toluene and once with 300 mL of isopentane. The catalyst was transferred to a one liter flask and was dried under vacuum for 12 hours. Yield of solid catalyst was 32 grams. The surface area of the catalyst particles was 3.64 square meters per gram. When ethylene was polymerized using the above procedure for determining productivity, it was found that the productivity of this heterogeneous catalyst was 23,967 g PE/g catalyst.

EXAMPLE 2

Example 1 was repeated in the same manner except that 18 g of ethylene was used in the prepolymerization step instead of 33 to 34 grams, the prepolymerization reaction was conducted for 85 minutes, and 19 grams of the solid catalyst of the invention was isolated. The surface area of this particulate catalyst was 6.90 square meters per gram. The productivity of this catalyst using the above procedure was 31,000 g PE/g catalyst.

EXAMPLE 3

Example 1 was again repeated with the exception that the amount of ethylene used in the prepolymerization was 46.8 grams, the prepolymerization was performed for 320 minutes, and the amount of isolated solid catalyst of this invention was 47 grams. The surface area of this solid catalyst was 2.57 square meters per gram. The productivity of this catalyst using the above procedure was 18,300 g PE/g catalyst.

EXAMPLE 4

In this Example the aluminoxane was heat treated before use in forming the catalyst of this invention. In particular, the methylaluminoxane used in this example previously had been heated as a 30% solution in toluene for 2 hours at 80° C. In all other respects the procedure was the same as that of Example 1. The surface are of this catalyst of the invention was 4.63 square meters per gram. The productivity of the heterogeneous catalyst of this invention formed in this manner and using the above procedure was 30,278 g PE/g catalyst.

The polyethylene polymers produced in Examples 1–4 above all had satisfactory particle size and morphology.

Other embodiments and features of the invention:

AA) An α-olefin prepolymerized Group 4 metallocene-aluminoxane particulate catalyst composition devoid of a preformed support and having a productivity, when fresh and if tested for productivity, of at least 18,000 grams of polyethylene per gram of catalyst in one hour, the metallocene having prior to prepolymerization at least one polymerizable olefinic substituent in the molecule.

AB) A catalyst composition according to AA) further characterized in that it has a specific surface area of no more than about 20 m$^2$/g.

AC) A catalyst composition according to AA) further characterized in that it has a specific surface area of less than about 10 m²/g.
AD) A catalyst composition according to AA) wherein the Group 4 metallocene used in forming said composition is a zirconium metallocene.
AE) A catalyst composition according to AA) wherein the aluminoxane used in forming said composition is a methylaluminoxane.
AF) A catalyst composition according to AA) wherein the Group 4 metallocene used in forming said composition is a zirconium metallocene, and wherein the aluminoxane used in forming said composition is a methylaluminoxane.
AG) A catalyst composition according to AF) wherein said composition has a specific surface area of no more than about 20 m²/g.
AH) A catalyst composition according to AF) wherein said composition has a specific surface area of less than about 10 m²/g.
AI) A catalyst composition according to AA) wherein said composition has a productivity, when fresh and if tested for productivity, of at least 25,000 grams of polyethylene per gram of catalyst in one hour.
AJ) A catalyst composition according to AI) further characterized in that it has a specific surface area of less than about 10 m²/g.
AK) A catalyst composition according to AI) wherein the Group 4 metallocene used in forming said composition is a zirconium metallocene.
AL) A catalyst composition according to AI) wherein the aluminoxane used in forming said composition is a methylaluminoxane.
AM) A catalyst composition according to AI) wherein the Group 4 metallocene used in forming said composition is a zirconium metallocene, wherein the aluminoxane used in forming said composition is a methylaluminoxane, and wherein said composition has a specific surface area of less than about 10 m²/g.
AN) A catalyst composition according to AA) wherein said composition has a productivity, when fresh and if tested for productivity, of at least 30,000 grams of polyethylene per gram of catalyst in one hour.
AO) A catalyst composition according to AN) further characterized in that it has a specific surface area of less than about 10 m²/g.
AP) A catalyst composition according to AN) wherein the Group 4 metallocene used in forming said composition is a zirconium metallocene.
AQ) A catalyst composition according to AN) wherein the aluminoxane used in forming said composition is a methylaluminoxane.
AR) A catalyst composition according to AN) wherein the Group 4 metallocene used in forming said composition is a zirconium metallocene, wherein the aluminoxane used in forming said composition is a methylaluminoxane, and wherein said composition has a specific surface area of less than about 10 m²/g.
AS) A catalyst composition according to AA) wherein the aluminoxane used in forming said composition is an aluminoxane that has previously been heated at a temperature of at least about 40° C.
AT) A catalyst composition according to AS) further characterized in that it has a specific surface area of less than about 10 m²/g.
AU) A catalyst composition according to AS) wherein the Group 4 metallocene used in forming said composition is a zirconium metallocene.
AV) A catalyst composition according to AS) wherein the aluminoxane used in forming said composition is a methylaluminoxane.
AW) A catalyst composition according to AS) wherein the Group 4 metallocene used in forming said composition is a zirconium metallocene, wherein the aluminoxane used in forming said composition is a methylaluminoxane, and wherein said composition has a specific surface area of less than about 10 m²/g.
AX) A catalyst composition according to AA) wherein the aluminoxane used in forming said composition is a methylaluminoxane that has previously been heated at a temperature of at least about 40° C.
AY) A catalyst composition according to AX) further characterized in that it has a specific surface area of less than about 10 m²/g.
AZ) A catalyst composition according to AX) wherein the Group 4 metallocene used in forming said composition is a zirconium metallocene.
BA) A catalyst composition according to AA) wherein the Group 4 metallocene used in forming said composition is a hafnium metallocene.
BB) An ethylene prepolymerized Group 4 metallocene-aluminoxane particulate catalyst composition devoid of a preformed support and having a productivity, when fresh and if tested for productivity, of at least 18,000 grams of polyethylene per gram of catalyst in one hour, the metallocene having prior to prepolymerization at least one polymerizable olefinic substituent in the molecule.
BC) A catalyst composition according to BB) further characterized in that it has a specific surface area of no more than about 20 m²/g.
BD) A catalyst composition according to BB) further characterized in that it has a specific surface area of less than about 10 m²/g.
BE) A catalyst composition according to BB) wherein the Group 4 metallocene used in forming said composition is a zirconium metallocene.
BF) A catalyst composition according to BB) wherein the aluminoxane used in forming said composition is a methylaluminoxane.
BG) A catalyst composition according to BB) wherein the Group 4 metallocene used in forming said composition is a zirconium metallocene, and wherein the aluminoxane used in forming said composition is a methylaluminoxane.
BH) A catalyst composition according to BG) wherein said composition has a specific surface area of no more than about 20 m²/g.
BI) A catalyst composition according to BG) wherein said composition has a specific surface area of less than about 10 m²/g.
BJ) A catalyst composition according to BB) wherein said composition has a productivity, when fresh and if tested for productivity, of at least 25,000 grams of polyethylene per gram of catalyst in one hour.
BK) A catalyst composition according to BJ) further characterized in that it has a specific surface area of less than about 10 m²/g.
BL) A catalyst composition according to BJ) wherein the Group 4 metallocene used in forming said composition is a zirconium metallocene.
BM) A catalyst composition according to BJ) wherein the aluminoxane used in forming said composition is a methylaluminoxane.
BN) A catalyst composition according to BJ) wherein the Group 4 metallocene used in forming said composition is a zirconium metallocene, wherein the aluminoxane used in forming said composition is a methylaluminoxane, and wherein said composition has a specific surface area of less than about 10 $m^2/g$.

BO) A catalyst composition according to BB) wherein said composition has a productivity, when fresh and if tested for productivity, of at least 30,000 grams of polyethylene per gram of catalyst in one hour.

BP) A catalyst composition according to BO) further characterized in that it has a specific surface area of less than about 10 $m^2/g$.

BQ) A catalyst composition according to BO) wherein the Group 4 metallocene used in forming said composition is a zirconium metallocene.

BR) A catalyst composition according to BO) wherein the aluminoxane used in forming said composition is a methylaluminoxane.

BS) A catalyst composition according to BO) wherein the Group 4 metallocene used in forming said composition is a zirconium metallocene, wherein the aluminoxane used in forming said composition is a methylaluminoxane, and wherein said composition has a specific surface area of less than about 10 $m^2/g$.

BT) A catalyst composition according to BB) wherein the aluminoxane used in forming said composition is an aluminoxane that has previously been heated at a temperature of at least about 40° C.

BU) A catalyst composition according to BT) further characterized in that it has a specific surface area of less than about 10 $m^2/g$.

BV) A catalyst composition according to BT) wherein the Group 4 metallocene used in forming said composition is a zirconium metallocene.

BW) A catalyst composition according to BT) wherein the aluminoxane used in forming said composition is a methylaluminoxane.

BX) A catalyst composition according to BT) wherein the Group 4 metallocene used in forming said composition is a zirconium metallocene, wherein the aluminoxane used in forming said composition is a methylaluminoxane, and wherein said composition has a specific surface area of less than about 10 $m^2/g$.

BY) A catalyst composition according to BB) wherein the aluminoxane used in forming said composition is a methylaluminoxane that has previously been heated at a temperature of at least 40° C.

BZ) A catalyst composition according to BY) further characterized in that it has a specific surface area of less than about 10 $m^2/g$.

CA) A catalyst composition according to BY) wherein the Group 4 metallocene used in forming said composition is a zirconium metallocene.

CB) A catalyst composition according to BB) wherein the Group 4 metallocene used in forming said composition is a hafnium metallocene.

CC) A process which comprises: (a) mixing together in an inert organic solvent medium at least one Group 4 metallocene having at least one polymerizable olefinic substituent in the molecule, and at least one aluminoxane, to form a catalytic solution and (b), contacting catalytic solution from (a) with a controlled amount of α-olefin monomer under polymerization conditions such that particulate solids are formed having a specific surface area of no more than about 20 square meters per gram ($m^2/g$).

CD) A process according to CC) wherein the mole ratio of α-olefin to Group 4 metallocene used in forming said solution is in the range of about 150:1 to about 1500:1.

CE) A process according to CC) wherein the mole ratio of α-olefin to Group 4 metallocene used in forming said solution is in the range of about 175:1 to about 1000:1.

CF) A process according to CC) wherein the atom ratio of aluminum to Group 4 metal in said solution is in the range of about 150:1 to about 1500:1.

CG) A process according to CC) wherein the atom ratio of aluminum to Group 4 metal in said solution is in the range of about 175:1 to about 1000:1.

CH) A process according to CC) wherein the mole ratio of α-olefin to Group 4 metallocene used in forming said solution is in the range of about 150:1 to about 1500:1; and wherein the atom ratio of aluminum to Group 4 metal in said solution is in the range of about 150:1 to about 1500:1.

CI) A process according to CC) wherein the mole ratio of α-olefin to Group 4 metallocene used in forming said solution is in the range of about 175:1 to about 1000:1; and wherein the atom ratio of aluminum to Group 4 metal in said solution is in the range of about 175:1 to about 1000:1.

CJ) A process according to CC) wherein the Group 4 metallocene is a zirconium metallocene and wherein the aluminoxane is entirely or predominately a methylaluminoxane.

CK) A process according to CC) wherein the aluminoxane comprises an aluminoxane that has previously been heated at a temperature of at least about 40° C.

CL) A process according to CC) wherein the Group 4 metallocene is a zirconium metallocene having a pair of cyclopentadienyl-moiety-containing groups connected together by a bridging group; and wherein the aluminoxane is entirely or predominately a methylaluminoxane.

CM) A process according to CC) wherein the Group 4 metallocene is a zirconium metallocene having a pair of cyclopentadienyl-moiety-containing groups connected together by a bridging group; and wherein the aluminoxane comprises a methylaluminoxane that has previously been heated at a temperature of at least about 40° C.

CN) A process which comprises: (a) mixing together in an inert hydrocarbon solvent medium at least one Group 4 metallocene having at least one polymerizable olefinic substituent in the molecule, and at least one aluminoxane, to form a catalytic solution; and (b) contacting catalytic solution from (a) with a controlled amount of ethylene under polymerization conditions such that particulate solids are formed having a specific surface area of no more than about 20 square meters per gram ($m^2/g$).

CO) A process according to CN) wherein the mole ratio of ethylene to Group 4 metallocene used in forming said solution is in the range of about 150:1 to about 1500:1.

CP) A process according to CN) wherein the mole ratio of α-olefin to Group 4 metallocene used in forming said solution is in the range of about 175:1 to about 1000:1.

CQ) A process according to CN) wherein the atom ratio of aluminum to Group 4 metal in said solution is in the range of about 150:1 to about 1500:1.

CR) A process according to CN) wherein the atom ratio of aluminum to Group 4 metal in said solution is in the range of about 175:1 to about 1000:1.

CS) A process according to CN) wherein the mole ratio of ethylene to Group 4 metallocene used in forming said solution is in the range of about 150:1 to about 1500: 1; and wherein the atom ratio of aluminum to Group 4 metal in said solution is in the range of about 150:1 to about 1500:1.

CT) A process according to CN) wherein the mole ratio of ethylene to Group 4 metallocene used in forming said solution is in the range of about 175:1 to about 1000: 1; and wherein the atom ratio of aluminum to Group 4 metal in said solution is in the range of about 175:1 to about 1000:1.

CU) A process according to CN) wherein the Group 4 metallocene is a zirconium metallocene.

CV) A process according to CN) wherein the aluminoxane is entirely or predominately a methylaluminoxane.

CW) A process according to CN) wherein the aluminoxane comprises a methylaluminoxane that has previously been heated at a temperature of at least about 40° C.

CX) A process according to CN) wherein the Group 4 metallocene is a zirconium metallocene having a pair of cyclopentadienyl-moiety-containing groups connected together by a bridging group; and wherein the aluminoxane is entirely or predominately a methylaluminoxane.

CY) A process according to CN) wherein the Group 4 metallocene is a zirconium metallocene having a pair of cyclopentadienyl-moiety-containing groups connected together by a bridging group; and wherein the aluminoxane comprises a methylaluminoxane that has previously been heated at a temperature of at least about 40° C.

CZ) A process according to CN) wherein the mole ratio of ethylene to Group 4 metallocene used in forming said solution is in the range of about 150:1 to about 1500:1; wherein the atom ratio of aluminum to Group 4 metal in said solution is in the range of about 150:1 to about 1500:1; and wherein the Group 4 metallocene is a zirconium metallocene.

DA) A process according to CZ) wherein the zirconium metallocene has a pair of cyclopentadienyl-moiety-containing groups connected together by a bridging group, and wherein the aluminoxane is entirely or predominately a methylaluminoxane.

DB) A process according to CN) wherein the mole ratio of ethylene to Group 4 metallocene used in forming said solution is in the range of about 175:1 to about 1000: 1; wherein the atom ratio of aluminum to Group 4 metal in said solution is in the range of about 175:1 to about 1000:1; wherein the Group 4 metallocene is a zirconium metallocene that has a pair of cyclopentadienyl-moiety-containing groups connected together by a bridging group, and wherein the aluminoxane is entirely or predominately a methylaluminoxane.

DC) A process according to DB) wherein the methylaluminoxane has previously been heated at a temperature of at least about 40° C.

DD) A process according to CN) wherein the mole ratio of ethylene to Group 4 metallocene used in forming said solution is in the range of about 150:1 to about 1500:1; wherein the atom ratio of aluminum to Group 4 metal in said solution is in the range of about 150:1 to about 1500:1; and wherein the Group 4 metallocene is a hafnium metallocene.

DE) A process according to DD) wherein the hafnium metallocene has a pair of cyclopentadienyl-moiety-containing groups connected together by a bridging group, and wherein the aluminoxane is entirely or predominately a methylaluminoxane.

DF) A process according to CN) wherein the mole ratio of ethylene to Group 4 metallocene used in forming said solution is in the range of about 175:1 to about 1000:1; wherein the atom ratio of aluminum to Group 4 metal in said solution is in the range of about 175:1 to about 1000:1; wherein the Group 4 metallocene is a hafnium metallocene that has a pair of cyclopentadienyl-moiety-containing groups connected together by a bridging group, and wherein the aluminoxane is entirely or predominately a methylaluminoxane.

DG) A process according to DF) wherein the methylaluminoxane has previously been heated at a temperature of at least about 40° C.

DH) A process which comprises: (a) mixing together in an inert hydrocarbon solvent medium at least one Group 4 metallocene having at least one polymerizable olefinic substituent in the molecule, and at least one aluminoxane, to form a catalytic solution wherein the atom ratio of aluminum to Group 4 metal in said solution is in the range of about 150:1 to about 1500:1; and (b) contacting catalytic solution from (a) with an amount of ethylene such that the mole ratio of ethylene to Group 4 metallocene used in forming said solution is in the range of about 150:1 to about 1500:1, and under polymerization conditions such that particulate solids are formed having a productivity, when fresh and if tested for productivity, of at least 18,000 grams of polyethylene per gram of catalyst in one hour.

DI) A process according to DH) wherein the atom ratio of aluminum to Group 4 metal in said solution is in the range of about 175:1 to about 1000:1, and wherein the mole ratio of ethylene to Group 4 metallocene used in forming said solution is in the range of about 175:1 to about 1000:1.

DJ) A process according to DH) wherein the Group 4 metallocene is a zirconium or hafnium metallocene, and wherein the aluminoxane is entirely or predominately a methylaluminoxane.

DK) A process according to DJ) wherein the methylaluminoxane has previously been heated at a temperature of at least about 40° C.

DL) A particulate catalyst composition comprising an α-olefin prepolymerized with at least one Group 4 metallocene and at least one aluminoxane, and/or a reaction product thereof, in a hydrocarbon solution devoid of any preformed support, said catalyst being characterized by having, when fresh and if tested for productivity, a productivity of at least 18,000 grams of polyethylene per gram of catalyst in one hour, the metallocene having prior to prepolymerization at least one polymerizable olefinic substituent in the molecule.

DM) A particulate catalyst composition comprising ethylene prepolymerized with at least one Group 4 metallocene and at least one aluminoxane, and/or a reaction product thereof, in a hydrocarbon solution devoid of any preformed support, said catalyst being characterized by having, when fresh and if tested for productivity, a productivity of at least 18,000 grams of polyethylene per gram of catalyst in one hour, the metallocene having prior to prepolymerization at least one polymerizable olefinic substituent in the molecule.

DN) A composition according to DM) wherein the Group 4 metallocene used in forming said hydrocarbon solution is a zirconium metallocene having a pair of cyclopentadienyl-moiety-containing groups connected together by a bridging group; and wherein the aluminoxane is entirely or predominately a methylaluminoxane, which optionally previously has been heated at one or more temperatures in the range of about 70 to about 90° C.

It is to be understood that the ingredients referred to by chemical name or formula anywhere in the specification or claims hereof, whether referred to in the singular or plural, are identified as they exist prior to coming into contact with another substance referred to by chemical name or chemical type (e.g., another reactant, a solvent, a diluent, or etc.). It matters not what preliminary chemical changes, transformations and/or reactions, if any, take place in the resulting mixture or solution or reaction medium as such changes, transformations and/or reactions are the natural result of bringing the specified reactants and/or components together under the conditions called for pursuant to this disclosure. Thus the reactants and other materials are identified as ingredients to be brought together in connection with performing a desired chemical reaction or in forming a mixture to be used in conducting a desired reaction. Accordingly, even though the claims hereinafter may refer to substances, components and/or ingredients in the present tense ("comprises", "is", etc.), the reference is to the substance or ingredient as it existed at the time just before it was first contacted, blended or mixed with one or more other substances or ingredients in accordance with the present disclosure. The fact that the substance or ingredient may have lost its original identity through a chemical reaction or transformation or complex formation or assumption of some other chemical form during the course of such contacting, blending or mixing operations, is thus wholly immaterial for an accurate understanding and appreciation of this disclosure and the claims thereof. Nor does reference to an ingredient by chemical name or formula exclude the possibility that during the desired reaction itself an ingredient becomes transformed to one or more transitory intermediates that actually enter into or otherwise participate in the reaction. In short, no representation is made or is to be inferred that the named ingredients must participate in the reaction while in their original chemical composition, structure or form.

Each and every patent or other publication or published document referred to in any portion of this specification is incorporated in toto into this disclosure by reference, as if fully set forth herein.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

What is claimed is:

1. A process for producing polymer which comprises contacting at least one polymerizable α-olefin monomer, optionally together with at least one diolefin monomer, with a particulate catalyst composition comprising an α-olefin prepolymerized with at least one Group 4 metallocene and at least one aluminoxane in a hydrocarbon solution devoid of any preformed support, said catalyst composition being characterized by having, when fresh and if tested for productivity, a productivity of at least 18,000 grams of polyethylene per gram of catalyst composition in one hour, the metallocene having prior to prepolymerization at least one polymerizable olefinic substituent in the molecule.

2. A process according to claim 1 wherein said α-olefin for the prepolymerization is ethylene.

3. A process according to claim 2 wherein said particulate catalyst composition is further characterized by having, prior to being used in said process, a specific surface area of no more than about 20 $m^2/g$.

4. A process according to claim 2 wherein said particulate catalyst composition is further characterized by having, prior to being used in said process, a specific surface area of less than about 10 $m^2/g$.

5. A process according to claim 2 wherein said particulate catalyst composition has a productivity, when fresh and if tested for productivity, of at least 25,000 grams of polyethylene per gram of catalyst in one hour.

6. A process according to claim 2 wherein said particulate catalyst composition has a productivity, when fresh and if tested for productivity, of at least 30,000 grams of polyethylene per gram of catalyst in one hour.

7. A process according to claim 2 wherein said particulate catalyst composition is further characterized by (i) having, prior to being used in said process, a specific surface area of less than about 10 $m^2/g$, and (ii) a productivity, when fresh and if tested for productivity, of at least 25,000 grams of polyethylene per gram of catalyst in one hour.

8. A process according to claim 2 wherein said particulate catalyst composition is further characterized by (i) having, prior to being used in said process, a specific surface area of less than about 10 $m^2/g$, and (ii) a productivity, when fresh and if tested for productivity, of at least 30,000 grams of polyethylene per gram of catalyst in one hour.

9. A process according to claim 2 wherein the Group 4 metallocene is a zirconium metallocene, and wherein the aluminoxane is entirely or predominately a methylaluminoxane.

10. A process according to claim 2 wherein the Group 4 metallocene is a zirconium metallocene, and wherein the aluminoxane comprises a methylaluminoxane that, prior to the prepolymerization used in forming said particulate catalyst composition, has been heated at one or more temperatures in the range of about 70 to about 90° C.

11. A process according to claim 2 wherein the contacting is performed as a gas-phase polymerization.

12. A process according to claim 2 wherein the contacting is performed in a liquid phase in which said particulate catalyst is dispersed or slurried.

13. A process according to claim 2 wherein the Group 4 metallocene is a zirconium metallocene that has a pair of cyclopentadienyl-moiety-containing groups connected together by a bridging group; wherein the aluminoxane is entirely or predominately a methylaluminoxane; wherein the polymerizable α-olefin monomer is ethylene, propylene, or a combination of ethylene and at least one $C_3$–$C_8$ α-olefin monomer copolymerizable with ethylene.

14. A process according to claim 13 and wherein the contacting is performed as a gas-phase polymerization.

15. A process according to claim 13 wherein the contacting is performed in a liquid phase in which said particulate catalyst is dispersed or slurried.

16. A process according to claim 1 wherein the catalyst composition is formed at temperatures in the range of about 10° C. to about 30° C.

17. A process according to claim 2 wherein the catalyst composition is formed at temperatures in the range of about 10° C. to about 30° C.

18. A process according to claim 17 wherein the catalyst composition in the hydrocarbon solution has an atom ratio of aluminum to Group 4 metal in the range of about 150:1 to about 1500:1.

19. A process according to claim 18 wherein the atom ratio of aluminum to Group 4 metal is in the range of about 175:1 to about 1000:1.

20. A process according to claim 1 wherein the catalyst composition in the hydrocarbon solution has an atom ratio of aluminum to Group 4 metal in the range of about 150:1 to about 1500:1.

21. A process according to claim 20 wherein the atom ratio of aluminum to Group 4 metal is in the range of about 175:1 to about 1000:1.

22. A process according to claim 2 wherein the catalyst composition in the hydrocarbon solution has an atom ratio of aluminum to Group 4 metal in the range of about 150:1 to about 1500:1.

23. A process according to claim 22 wherein the atom ratio of aluminum to Group 4 metal is in the range of about 175:1 to about 1000:1.

24. A process according to claim 1 wherein the polymerizable olefinic substituent has a terminal carbon-to-carbon double bond on a bridging group linking a pair of cyclopentadienyl-moeity-containing groups together in the metallocene.

25. A process according to claim 24 wherein said α-olefin for the prepolymerization is ethylene.

26. A process according to claim 24 wherein the Group 4 metallocene is a zirconium metallocene.

27. A process according to claim 26 wherein said α-olefin for the prepolymerization is ethylene.

28. A process according to claim 2 wherein the polymerizable α-olefin monomer is ethylene, propylene, or a combination of ethylene and at least one $C_3$–$C_8$ 1-olefin copolymerizable with ethylene.

29. A process according to claim 28 wherein the polymerizable olefinic substituent has a terminal carbon-to-carbon double bond on a bridging group linking a pair of cyclopentadienyl-moeity-containing groups together in the metallocene.

30. A process according to claim 29 wherein the Group 4 metallocene is a zirconium metallocene.

31. A process for producing polymer which comprises contacting at least one polymerizable α-olefin monomer, optionally together with at least one diolefin monomer, with a particulate catalyst composition comprising an α-olefin prepolymerized with at least one Group 4 metallocene and at least one aluminoxane in a hydrocarbon solution devoid of any preformed support, said catalyst composition being characterized by having, when fresh and if tested for productivity, a productivity of at least 18,000 grams of polyethylene per gram of catalyst composition in one hour, the metallocene having prior to prepolymerization at least one polymerizable olefinic substituent in the molecule, the molar ratio of α-olefin to metallocene in the prepolymerization being in the range of about 150 to about 1500.

32. A process according to claim 31, wherein the molar ratio of α-olefin to metallocene in the prepolymerization is in the range of about 175 to about 1000.

* * * * *